United States Patent [19]

Crothall et al.

[11] Patent Number: 5,596,593
[45] Date of Patent: Jan. 21, 1997

[54] ORTHOGONAL RFDC TRANSVERSE EXCITED GAS LASER

[75] Inventors: Katherine D. Crothall, Gladwyne, Pa.; Edward S. Schieferstein, Everett; Steven E. Wojcik, Lynnwood, both of Wash.

[73] Assignee: Luxar Corporation, Bothell, Wash.

[21] Appl. No.: 598,899

[22] Filed: Feb. 9, 1996

[51] Int. Cl.[6] ................................................. H01S 3/097
[52] U.S. Cl. .............................. 372/87; 372/86; 372/83; 372/82
[58] Field of Search .................................. 372/87, 86, 83, 372/82, 81, 38

[56] References Cited

U.S. PATENT DOCUMENTS

| | | | |
|---|---|---|---|
| 3,588,740 | 6/1971 | Bell et al. | 372/81 |
| 4,169,251 | 9/1979 | Laakmann | 331/94.5 G |
| 4,363,126 | 12/1982 | Chenausky et al. | 372/38 |
| 4,373,202 | 2/1983 | Laakman et al. | 372/64 |
| 4,438,514 | 3/1984 | Chenausky et al. | 372/64 |
| 4,443,877 | 4/1984 | Chenausky et al. | 372/38 |
| 4,612,643 | 9/1986 | Long et al. | 372/38 |
| 4,648,093 | 3/1987 | Saanett et al. | 372/82 |
| 4,719,639 | 1/1988 | Tulip | 372/66 |
| 4,719,640 | 1/1988 | Chenausky et al. | 372/97 |
| 4,805,182 | 2/1989 | Laakman | 372/82 |
| 4,887,272 | 12/1989 | Karube et al. | 372/82 |
| 5,048,048 | 9/1991 | Nishimae et al. | 372/95 |
| 5,097,472 | 3/1992 | Chenausky | 372/86 |
| 5,123,028 | 6/1992 | Hobart et al. | 372/95 |
| 5,151,915 | 9/1992 | Paoli | 372/38 |
| 5,454,003 | 9/1995 | Murata et al. | 372/82 |
| B1 4,719,639 | 6/1994 | Tulip | 372/66 |

OTHER PUBLICATIONS

Clyde O. Brown and Jack W. Davis, "Closed–cycle performance of a high–power electric–discharge laser," *Appl. Phys. Letters,* vol. 21, No. 10, Nov. 15, 1972, pp. 480–481.

*Primary Examiner*—Leon Scott, Jr.
*Attorney, Agent, or Firm*—Seed and Berry LLP

[57] ABSTRACT

A gas laser having a housing including a discharge region that contains a lasing gas medium, a pair of DC electrodes having primary surfaces facing toward the discharge region, the primary surfaces being arranged in substantially parallel planes, and a pair of RF electrodes having secondary surfaces facing toward the discharge region, the secondary surfaces being in substantially parallel planes with the secondary surfaces being arranged substantially orthogonal to the primary surfaces. The gas laser also has an RF power source connected between said pair of RF electrodes and selectively generating an RF discharge in the discharge region, and a DC power source connected between said pair of DC electrodes and selectively generating a DC discharge in the discharge region.

28 Claims, 3 Drawing Sheets

5,596,593

ORTHOGONAL RFDC TRANSVERSE EXCITED GAS LASER

TECHNICAL FIELD

The present invention relates to gaseous lasers and, more particularly, to RFDC transverse excited gas lasers.

BACKGROUND OF THE INVENTION

Gaseous lasers have a number of useful industrial and medical applications. In particular, the carbon dioxide ($CO_2$) laser is exceptionally useful in medical applications. The wavelengths emitted from a $CO_2$ laser, between 9–11 μm, are highly absorbed by water and provide the laser with the ability to vaporize the water in tissue.

It is often desirable in medical or industrial applications to have a laser capable of emitting a continuous wave (CW) low power output that is also capable of emitting a pulsed high power output. For example, a $CO_2$ laser that emits a low power CW output is capable of such medical applications as hemostasis; however, the low power CW output cannot be used to cut away hard tissue without causing significant damage to surrounding soft tissue. On the other hand, a $CO_2$ laser that is capable of emitting a pulse having a high peak power can be used for the abalation of hard tissue. Accordingly, a laser's versatility is increased as a medical tool if it is capable of emitting a low power CW output and a high power pulsed output.

Traditionally, most gaseous lasers, including $CO_2$ lasers, utilize a laser exciting discharge that is transverse to the laser's longitudinal axis. The discharge is often excited by a pulsed "DC" power supply. However, when using a transverse discharge geometry the cathode of the electrodes inducing the discharge is such a poor electron emitter that a positive ion current dominates in a region immediately adjacent to it, known as the cathode fall region. As a result, a positive space charge is formed in the cathode fall region. The electric fields resulting from this positive space charge cause electrons emitted from the cathode to be accelerated sufficiently so that an avalanche ionization effect occurs in the cathode fall region. Further, the outer extremity of the cathode fall region has an electron density that is so large that an electron dominated current occurs throughout the remainder of the discharge.

For the reasons given above, it is difficult to obtain a uniform discharge throughout the discharge region, and there is a tendency for an arc to form between the electrodes carrying the charge. Further, it has been found that the occurrences of a non-uniform discharge increase as lasers utilize longer pulses or higher specific energy inputs. The high electrical fields in the cathode fall region as well as the occurrence of arcing will tend to disassociate the laser gas thereby reducing the laser's life. In $CO_2$ lasers, oxygen is freed from some of the carbon dioxide gas within the discharge region causing corrosion.

Attempts have been made to prevent non-uniform discharge and arcing by preionizing the discharge. Other attempted solutions include manipulating the voltage pulse, tailoring the shape of the electrodes, or replacing the DC power supply with a radio frequency (RF) power supply.

Forms of preionization include the use of an electron beam, flashlamp, ultraviolet (UV) radiation, or a localized radio frequency (RF) discharge. The use of an electron beam for preionization has been found to be effective; however, it is usually far too expensive to implement on a commercial level.

Attempts at preionization using UV radiation or an RF discharge have only been marginally successful. A majority of UV and RF preionization techniques provide preionization in only a small localized region within the discharge region. Thus, no uniformity through out the discharge region is possible and often some form of gas flow is required.

The tailoring of electrode and/or pulse shapes has been successful and is widely used for transverse excitation atmospheric pressure lasers (TEA lasers), as well as commercial and military lasers. Unfortunately, this method of providing a uniform discharge only works if the input pulse is kept short, typically less than several microseconds for a $CO_2$ laser.

By using a laser with a transverse RF discharge, as discussed in U.S. Pat. No. 4,169,251, instead of a transverse DC discharge, a more uniform discharge is produced. The utilization of the transverse RF discharge minimizes the tendency for arc formation as long as the frequency of the RF field is high enough to ensure a negligible interaction of the discharge electrons with the electrodes. This occurs when the polarity of the alternating electric field between the electrodes is reversed with sufficient rapidity so that electrons in the discharge region have insufficient time to travel between the electrodes. The electrodes function only to control the electron and ion movement in the discharge using the alternating electric field and they do not provide any part of the discharge current. This eliminates the cathode fall region and the high electric fields therein. Further, this form of laser exciting discharge tends to exhibit a positive impedance characteristic that increases discharge stability and uniformity. Continuous wave (CW) operation using a transverse RF discharge is easy to achieve unless the specific energy inputs become exceedingly high. Indeed, the vast majority of gaseous lasers sold today with average powers less than 200 watts are excited using a transverse RF discharge.

Unfortunately, transverse RF discharge excitation becomes very expensive to implement if high peak powers are required. Unlike the components required for high power DC operation, which are relatively efficient and inexpensive, high power RF operation requires more exotic components, such as vacuum tube switching, etc. For example, to obtain a peak laser energy of one joule with a pulse width of 100 microseconds and an average power of only 10 watts, an RF input power of roughly 60 kilowatt peak and 60 watt average would be required. Although the cost of producing a continuous wave 60 watt laser using an RF discharge would be no more than a few hundred dollars, the cost of producing a laser power supply having the required peak power would be approximately $10,000 or more if it has the preferred solid-state design. Thus, RF transverse excitation is prohibitively expensive in many applications requiring high peak powers.

CW operation using transverse RF discharge excitation produces a stable uniform discharge. However, the components necessary for an RF excited laser are determined by the peak power requirement, and the high power components required for RF discharge excitation are extremely expensive. The prior art, as described in U.S. Pat. No. 5,097,472, in an attempt to overcome this problem, substitutes a high power transverse RF discharge with a high power DC discharge preceded by an RF preionization pulse. The technique makes possible the use of an inherently unstable high power DC discharge by providing a uniform preionization to the entire discharge region. Further, the substitution of the high power transverse RF discharge with the pulsed DC discharge and RF preionization allows a substantial reduction in the cost of components and operation.

As shown in FIG. 1, the prior art device of U.S. Pat. No. 5,097,472 has a laser vacuum envelope 110 that contains a grounded electrode 122, a shaped second electrode 124, dielectric spacers 126 and a further dielectric spacer 128. The dielectric spacers 126 set the spacing between the second electrode 124, to which a potential is applied, and the grounded electrode 122. Electrodes 122 and 124 cooperate to produce an internal capacitance C100 in the region where a transverse discharge will be established. This above-described circuit also includes a second, external capacitor C102, which has a first plate connected to electrode 122. An inductor L 101 is connected between the second electrode 124 and the other plate of capacitor C102. Capacitor C102, inductor L101 and internal capacitance C100 cooperate to define an impedance matching network. A low energy RF source 134 is coupled to the network formed by capacitor C102, inductor L101, and internal capacitance C100 via a capacitor C103.

Pulse DC energy is supplied to the laser by means of discharging a capacitor C106, which is bridged by and charged from a high energy DC current source 136. A filter represented by inductance L 104 and capacitor C107, which are in parallel resonance for the frequency of the RF source 134, is connected between the DC source 136 and the RF source 134 and acts as an RF trap to prevent the transmission of RF energy to the DC source 136. In turn, the RF source 134 is protected against the DC source 136 by the capacitor C103.

The laser includes a discharge chamber 130 defined in part by a pair of spaced-apart oppositely facing mirrors (not shown). The gas discharge occurs in the discharge region between these mirrors and between electrodes 122 and 124.

In operation, energy from the RF source 134 is applied between electrodes 122 and 124 in order to preionize a laser medium. Power from the RF source 134 must be applied across electrodes 122 and 124 such that a voltage in excess of that needed to establish a weak gas discharge will be present. When a discharge is established by the low energy RF source 134, a path for the discharge of a capacitor C106, or a path for a lower frequency unrectified alternating current from the DC source 136, will be created between the electrodes 122 and 124 and energy will flow from the capacitor C106 and/or the high energy DC source 136.

Although this prior art laser design solved many of the disadvantages found in transverse excited gas lasers, there are still a number of notable disadvantages that remain. Foremost is that the prior art laser cannot independently optimize the electrode shaping and spacing for both the RF and DC discharges since both must use the same electrodes 122 and 124. Also, extreme care must be taken to ensure that the RF and DC sources 134 and 136 are appropriately isolated from one another. Another disadvantage is that any attempt to minimize the cathode fall region by changing the area of the electrodes 122 and 124 will directly influence the effectiveness of the RF source 134, since the RF source uses the same electrodes. Further, the prior art laser suffers from having a discharge region that is made from disparate materials, leading to thermally induced geometric distortion of the discharge region during the laser's use. Finally, the prior art laser uses costly machined ceramic components.

SUMMARY OF THE INVENTION

In one aspect, the invention is a gas laser comprising a housing including a discharge region that contains a lasing gas medium, a pair of DC electrodes having primary surfaces facing toward the discharge region, the primary surfaces being arranged in substantially parallel planes, and a pair of RF electrodes having secondary surfaces facing toward the discharge region, the secondary surfaces being in substantially parallel planes with the secondary surfaces being arranged substantially orthogonal to the primary surfaces. The laser also comprises an RF power source connected between the pair of RF electrodes and selectively generating an RF discharge in the discharge region, and a DC power source connected between the pair of DC electrodes and selectively generating a DC discharge in the discharge region.

In another aspect, the invention is a method for producing laser energy with a gas laser having a housing that contains a lasing gas medium and supports a pair of substantially parallel RF electrodes each having a first surface and a pair of substantially parallel DC electrodes each having a second surface, the pairs of RF electrodes and DC electrodes being respectively connected to an RF power source and a DC power source. The method comprises the steps of applying a high frequency signal from the RF power source to the pair of RF electrodes, producing an RF discharge in the lasing gas medium that is sufficient to ionize the lasing gas medium between the first surfaces of the pair of RF electrodes, and providing the second surfaces of the DC electrodes so they are capable of producing a DC discharge that is substantially orthogonal to the RF discharge.

In another aspect, the invention is a gas laser comprising a housing including a plurality of bores, each bore having a discharge region that produces an individual beam, and being defined by a pair of DC electrodes each having a primary surface facing the discharge region of the bore, the pair of primary surfaces being arranged in substantially parallel planes, and a pair of RF electrodes each having a planar surface facing the discharge region of the bore, the pair of planar surfaces being arranged in substantially parallel planes with the planar surface of each of the RF electrodes being substantially orthogonal to the primary surfaces of the DC electrodes. The gas laser also comprises an optical device that combines the individual beams from the plurality of bores to form a combined beam, an RF power source connected by an RF coupling circuit to the pair of RE electrodes of each of the plurality of bores, a DC power source connected by a DC coupling circuit to the pair of DC electrodes of each of the plurality of bores, the DC power source and DC coupling circuit being isolated from the RE power source and the RE coupling circuit, and a switching circuit in communication with at least the DC coupling circuit for controlling the connection of the DC power source to the pair of DC electrodes of each of the plurality of bores.

In yet another aspect, the invention is a gas laser comprising a housing including a discharge region that contains a lasing gas medium, a pair of DC electrodes having primary surfaces facing toward the discharge region, the primary surfaces being substantially parallel to each other, and a pair of RE electrodes having secondary surfaces facing toward the discharge region and arranged substantially parallel to each other but not parallel to the primary surfaces. The gas laser also comprises an RE power source connected by an RE coupling circuit to the pair of RE electrodes, a DC power source connected by a DC coupling circuit to the pair of DC electrodes, the DC power source and the DC coupling circuit being isolated from the RE power source and the RE coupling circuit, and a switching circuit in communication with at least the DC coupling circuit for switching between a continuous wave mode and a pulse mode by controlling the connection of the DC power source to the pair of DC electrodes.

DETAILED DESCRIPTION OF THE INVENTION

Figure 2:
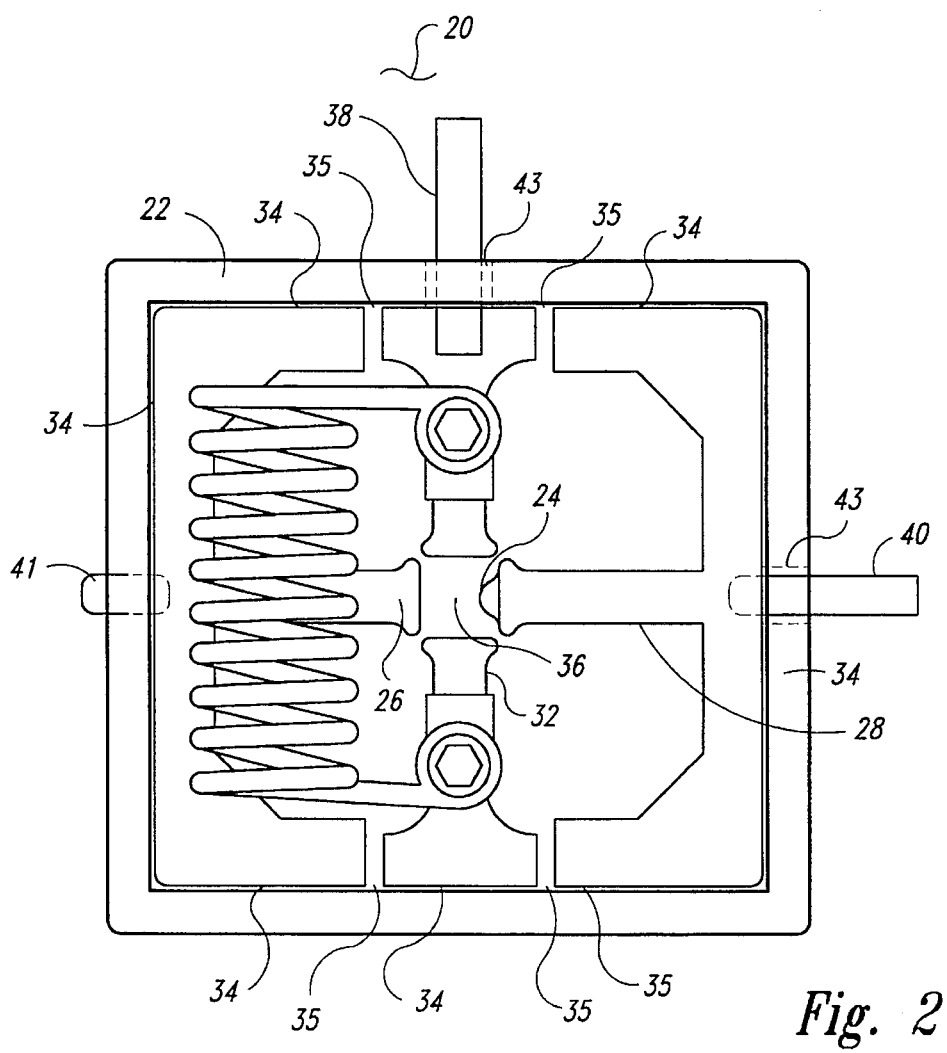
FIG. 2 is a cross-sectional view, illustrating a laser in accordance with the present invention.

As shown in FIG. 2 for purposes of illustration, the present invention is embodied in an RFDC orthogonal gas laser 20. The gas laser 20 comprises a housing 22 that contains a gaseous laser gain medium as well as DC electrodes 26 and 28, and RF electrodes 30 and 32. The laser gain medium is a standard $CO_2$ laser gas mixture. The gas laser 20 utilizes RF and DC discharges which both run transversely to the longitudinal axis of the laser head. However, unlike the prior art, the RF discharge is applied orthogonal to the DC discharge. This is accomplished by placing the RF electrodes 30 and 32 substantially parallel to each other and arranging them perpendicular to the DC electrodes 26 and 28. Both pairs of electrodes run the length of the housing 22 and are terminated at each end by a pair of aligned reflectors (not shown), to form a stable resonator with a discharge region 36 between the DC and RF electrodes. By separating the electrodes in this manner more control can be obtained over the shape and spacing of the electrodes. Also, the materials used in the gas laser 20 provide a more uniform excitation of the discharge region 36.

As stated above, by using separate electrodes for both the DC and RF discharges, the shapes of the electrodes can be optimized to provide a more uniform discharge distribution and to optimize the efficiency of the gas laser 20. Here, the DC electrode 26 is grounded via a DC return 41 while the other DC electrode 28 is coupled to a DC source 48 (see FIG. 5) via a low inductance series of parallel capacitors forming a transmission line or Blume line connected to a high voltage DC input terminal 40. The shapes of DC electrodes 26 and 28 are optimized by allowing at least one of the electrodes to deviate from a planar geometry to produce a more uniform electrical field distribution within the discharge region 36. One example of this selective shaping of electrodes maintains the DC electrode 26 as a planar shape, while the DC electrode 28 is shaped to form a Chang profile on surface 24, as discussed in T. Y. Chang, "Improved Uniform-Field Electrode Profiles for TEA Laser and High Voltage Applications," *Review of Scientific Instruments,* 44:4, April 1973, pp. 405–407. Alternatives to the Chang profile on surface 24, such as a Rogowski profile, could also be used. By shaping the DC electrode 28 in this manner, a more uniform discharge will be achieved, especially for high pressure pulsed lasers.

RF energy is applied to the RF electrodes 30 and 32 via an RF input terminal 38. The RF electrodes 30 and 32 are formed by substantially parallel opposing plates. The optimal profile for the RF electrodes is not necessarily the optimal profile for the DC electrodes. For example, the RF electrode's profile is optimally a planar surface, not the Chang type profile which is used to optimize the DC discharge. Further, non-uniformities in the electric field between the RF electrodes can be reduced by slightly rounding the electrodes' edges. This allows a more desirable E/N in the discharge region 36, which in turn increases the efficiency of the laser.

By using separate electrodes for the DC and RF discharges, the spacing between parallely positioned electrodes can be separately optimized for the DC electrodes 26 and 28 and for the RF electrodes 30 and 32. For best results, the DC electrodes 26 and 28 are spaced from 1 mm to 2 cm apart. The DC discharge is confined by the two RF electrodes 30 and 32, which optimally have a spacing of between 1 mm to 7 mm apart. The optimal spacings for the DC discharge and the RF discharge are not necessarily the same. For example, where a very high peak laser energy is required, the discharge geometry should have an aspect ratio that is significantly different from 1:1.

Figure 1:
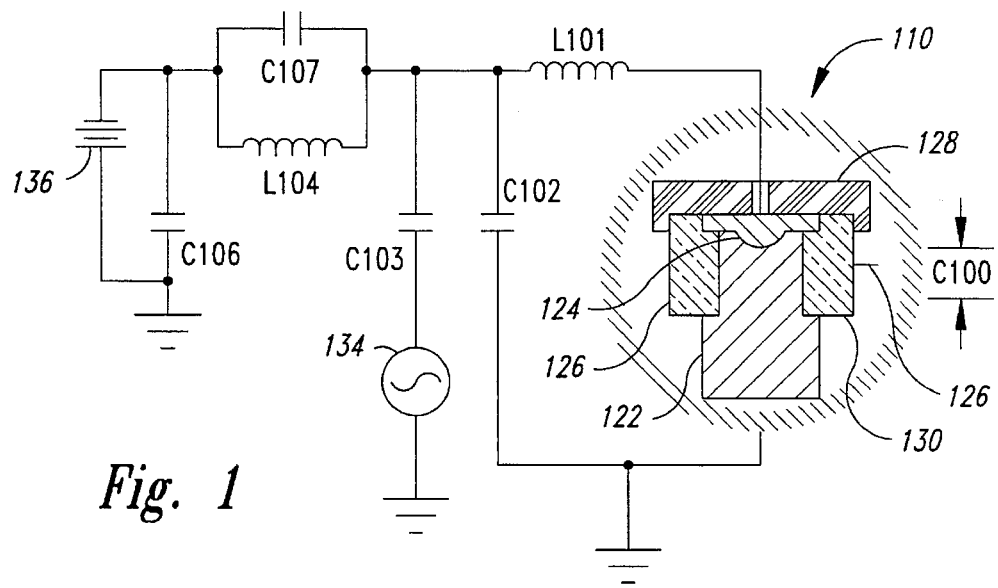
FIG. 1 is a cross-sectional view, partly in schematic form illustrating a transverse excited laser in accordance with the prior art.
Figure 3:
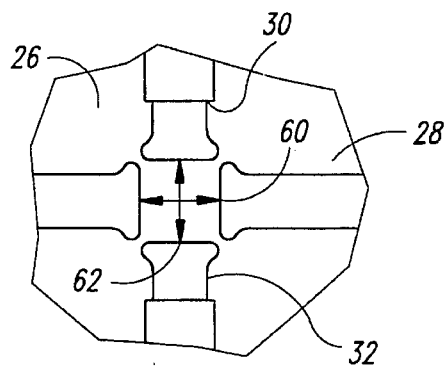
FIG. 3 is a cross-sectional view illustrating an alternative configuration of the discharge region for the laser of FIG. 2.

A large discharge volume can be obtained and more power can be applied in the DC discharge by altering the square-type geometry shown in FIGS. 1 and 2 to the rectangular geometry shown in FIG. 3. By increasing the spacing 60 between the DC electrodes 26 and 28, and decreasing the spacing 62 between the RF electrodes 30 and 32, a number of benefits are obtained. First, the cathode fall region of the DC discharge becomes less significant. Second, the area of the DC discharge is minimized, thus there is less tendency for an arc to form. Finally, less RF energy is required when the RF electrodes 30 and 32 are close to one another.

Figure 4:
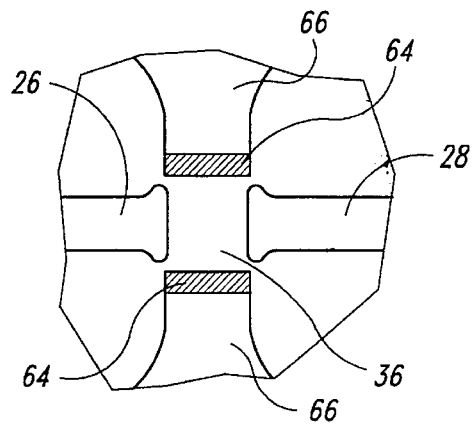
FIG. 4 is a cross-sectional view illustrating an alternate embodiment of the RF electrodes of the present invention.

The two DC electrodes 26 and 28 are constructed of a conductive substance, usually a metal, where the conductive substance is directly exposed to the discharge region 36. The two RF electrodes 30 and 32 do not need to be directly exposed to the discharge region 36, and are constructed of a dielectric in combination with a metal. For example, the RF electrodes 30 and 32 may be formed by using metal spacers 66 with dielectric strips 64 placed thereon, as shown in FIG. 4. These dielectric strips 64 run approximately the width and length of the discharge region 36.

If the DC and RF electrodes are made out of the same materials, then the use of parallely positioned pairs of electrodes to define the discharge chamber 36 will ensure a highly stable geometry during the laser's use. An even more stable geometry will be provided when the entire structure of the gas laser 20, including the housing 22, and the plates forming the transverse walls (not shown), are manufactured out of homogeneous materials, as described in U.S. Pat. No. 4,805,182, which is incorporated by reference herein.

By placing the parallely positioned RF electrodes 30 and 32 orthogonal to the parallely positioned DC electrodes 26 and 28, and by making all the electrodes of the same material, the amount of expansion of the materials defining the discharge region 36 that results from thermal variations will be uniform since all the materials have the same coefficient of expansion, and will expand and contract at the same rate. The symmetrical design of the discharge region 36 (i.e., opposing electrodes being the same dimension) also tends to ameliorate the distortive effects of temperature changes. The expansion of symmetrically positioned structures having the same coefficient of expansion will cause any expansion or contraction to be proportional throughout the structure, thereby preventing any misalignment of the discharge region 36. Therefore, misalignments caused by the heating and cooling of the gas laser 20 during operation are avoided.

In a preferred embodiment, the entire laser structure including the housing 22 is fabricated of aluminum. Aluminum is a desirable material to use since it is inexpensive and lends itself to extrusion. Further, aluminum is an easy material to machine to the precise measurements needed for the discharge region 36. The DC electrodes 26 and 28, the RF electrodes 30 and 32, as well as the housing 22 of the gas laser 20, can all be made of the aluminum. However, variations in temperature will cause aluminum to expand or contract a substantial amount. Thus, the use of symmetrical components, which are entirely fabricated of aluminum, to define the discharge region 36, as discussed above, is especially important to prevent any misalignments from occurring.

If both the DC and RF electrodes are in fact metal and they are positioned as shown in FIG. 2, then some form of insulation must be provided to prevent inadvertent shorting and arcing. For example, dielectric spacers 34 and an air gap 35 can be used to assist in separating the electrodes from each other as shown in FIG. 2. These dielectric spacers can also be placed between each electrode, and an air gap can be relied upon to provide insulation.

The preferred method of insulating the surfaces of the metal electrodes is by chemically transforming their surfaces into insulators. For example, the two RF electrodes 30 and 32 can be chemically treated by a process such as anodization to become insulators, while the DC electrodes 26 and 28 can be chemically treated as well except for the surface facing toward the discharge region 36, which can be masked during the chemical treatment.

If the preferred material of aluminum is insulated by the preferred method of anodization, then the aluminum is hard anodized with a thick layer of aluminum oxide by an anodic process well known in the art. The anodization insulates adjacent aluminum components, and only portions that must conduct, such as the high voltage bore surfaces, inductors and contacts, are masked to prevent the anodization. Since the RF electrodes 30 and 32 do not conduct, the surfaces of these electrodes that face toward the discharge region 36 can be anodized. The anodization process simplifies the laser structure, by reducing the amount of insulating components required and allowing components to be directly clamped together.

Natural anodizing of the aluminum is the preferred method of insulating components. However, in an alternative embodiment, the same insulating effect may be achieved by sputtering a few millimeters of polymide on the individual components. Polymide is a material having excellent electrical and thermal properties and it also has an expansion coefficient which closely matches that of aluminum.

The anodization or the sputtering of polymide on aluminum will allow efficient cooling of the gas laser 20 and will still isolate the RF electrodes 30 and 32 from the DC electrodes 26 and 28. For example, the breakdown voltage of anodized aluminum can be as high as 900 volts per millimeter.

Finally, the "all metal" geometry eliminates the need for machined ceramic parts. This significantly reduces the cost of manufacturing the components that surround and define the gaseous discharge region 36.

Figure 5:
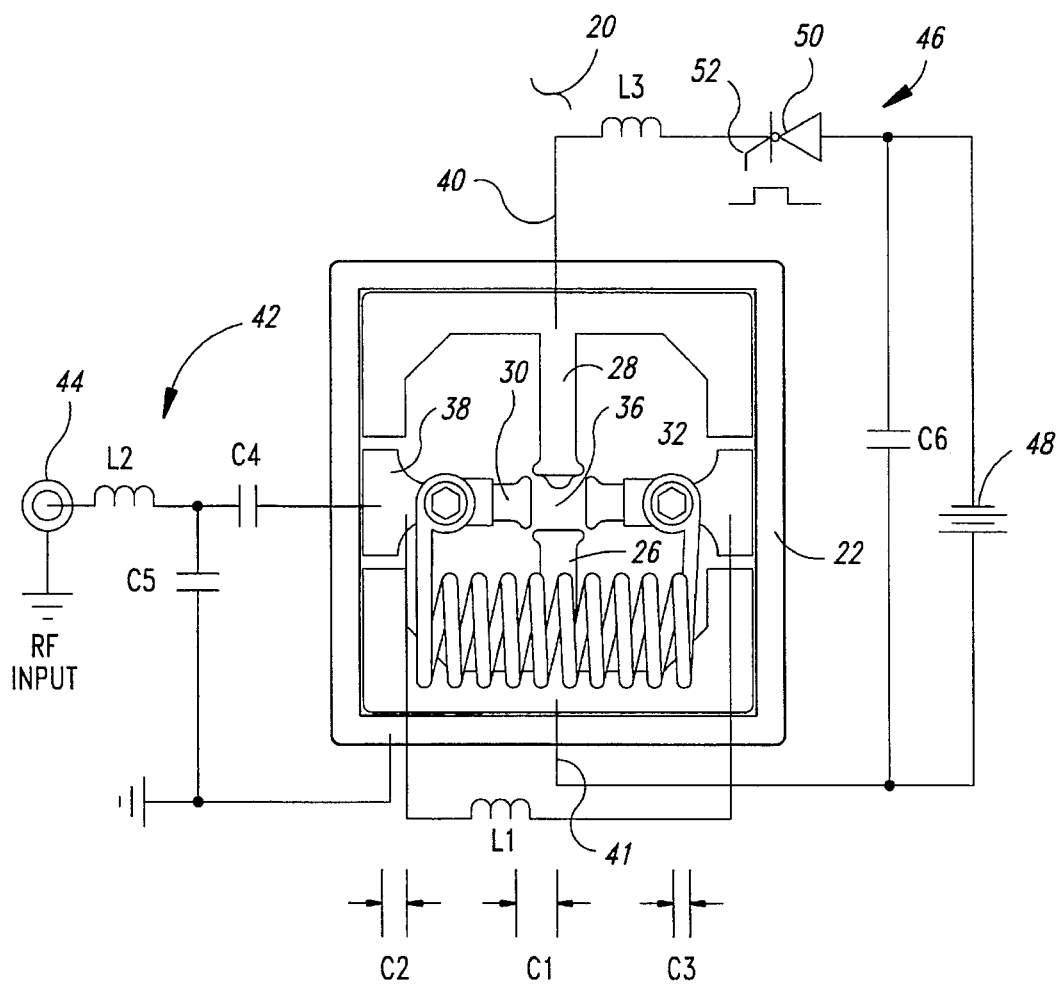
FIG. 5 is a cross-sectional view, partly in schematic form, illustrating the laser and driving circuitry in accordance with the present invention.

An exemplary DC coupling circuit 46 and an exemplary RF coupling circuit 42 capable of being employed in the present invention are shown in FIG. 5. Unlike the prior art of FIG. 1, the RF coupling circuitry 42 and the DC coupling circuitry 46 can be completely isolated.

The RF coupling circuitry 42 couples an RF source 44 between the RF electrodes 30 and 32 and includes an RF inductor L1, which is connected across the RF electrodes. The RF coupling circuitry also comprises an RF inductor L2, which couples the RF source 44 to capacitors C4 and C5. Capacitor C4 is coupled to the RF input terminal 38, and capacitor C5 is grounded. The coupling circuit 42 creates an RF tuned circuit that functions to neutralize the capacitances of capacitors C1, C2, and C3 of the laser 20.

The RF signal from the RF source 44 is supplied to the RF input terminal 38, and the grounded electrode 32. The RF electrode 32 in FIG. 5 is grounded by coupling the housing 22 to some reference voltage, preferably ground, and using a non-insulated surface of the grounded electrode 32 in contact with a non-insulated surface of the housing 22. The RF input terminal 38 is insulated from the grounded housing 22 by a dielectric insulator 43.

The DC coupling circuit 46 couples the DC source 48 across DC electrodes 26 and 28 and includes a capacitor C6 in parallel with the DC source 48. The DC coupling circuit 46 also includes a silicon controlled rectifier (SCR) 50 in series with an inductor L3 which connect the capacitor C6 and the DC source 48 to the high voltage input terminal 40. The DC signal from the DC source 48 is supplied to the DC electrode 28 via the DC input terminal 40. The DC input 40 is insulated from the grounded housing 22 by the dielectric insulator 43, as shown in FIG. 2. The DC electrode 26 in FIG. 5 is grounded by a DC return 41 by placing a non-insulated surface of the DC return 41 in contact with the DC electrode 26. Thus, a discharge may be induced between DC electrodes 26 and 28 when the SCR 50 is activated, i.e., switched on.

The gas laser 20 can be operated in either continuous wave (CW) or pulsed operation by applying the RF source 44, or a combination of the RF source 44 and the DC source 48 as follows.

To operate the gas laser 20 in a CW mode, the RF source 44 is switched on so that an RF signal is applied across the RF electrodes 30 and 32. This will establish an electric discharge in the $CO_2$ lasing medium in the discharge region 36 sufficient to invert the population of the energy levels of the desired laser transition. The resulting CW beam is capable of performing hemostasis and other similar operations. Typically, no DC voltage would be applied during this operation.

The gas laser 20 can be operated in the pulse mode by initially applying an RF pulse discharge to the RF electrodes 30 and 32 to preionize the discharge region 36 and then applying a subsequent DC pulse to the DC electrodes 26 and 28 to cause a discharge in the discharge region 36. The precedent RF discharge ensures a uniform DC discharge free from any arcing. The RF energy when used solely to preionize the discharge region 36 is applied as described above, and maintained at a voltage lower than the breakdown voltage, and at times lower than the sustaining voltage. To achieve the preionizing effect, the discharge may only require a duration of as little as 5–10 microseconds. Typically, the applied RF energy is less than 10% of the energy in the subsequent DC pulse.

Pulse operation is accomplished by the application of a DC pulsed discharge across the DC electrodes 26 and 28 once the discharge region 36 has been preionized by the RF pulse. The DC pulsed discharge is produced upon the activation of the SCR 50 for a duration of time determined by a trigger pulse. This trigger pulse is created by a pulse forming network that is well known in the art. Each occurrence of the trigger pulse on line 52 will switch on the SCR 50 and allow the DC source 48, or if the capacitor C6 has been charged, a discharge of capacitor C6, to be applied across DC electrodes 26 and 28. The DC voltage applied across the DC electrodes 26 and 28 is kept less than the breakdown voltage of the gaseous laser gain medium so that no discharge can occur without the RF preionization. Preferably, the RF source is discontinued prior to applying the DC source to the DC electrodes 26 and 28, however, the present invention, unlike the prior art, allows the simultaneous application of both the RF and DC sources 44 and 48 if the user so desires.

The increase in power due to the DC discharge will produce a beam of significant power that is capable of operations such as the abalation of hard tissue. For example, while the typical power output due to RF energy is around 20 watts, the output due to DC energy can reach beyond 300 watts. This high power output may be produced by a consecutive series of the trigger pulses.

As shown in FIG. 3, a slab geometry is used in the illustrated embodiment. In this type of geometry, light is guided in a narrow direction of the rectangular discharge region 36 by the surfaces of electrodes 30 and 32, but may be allowed to propagate in free space in the wider direction between electrodes 26 and 28. Alignment is crucial when using a slab type geometry; however, this type of geometry is now more practicable since the present invention reduces misalignments caused by temperature variation.

Figure 7:
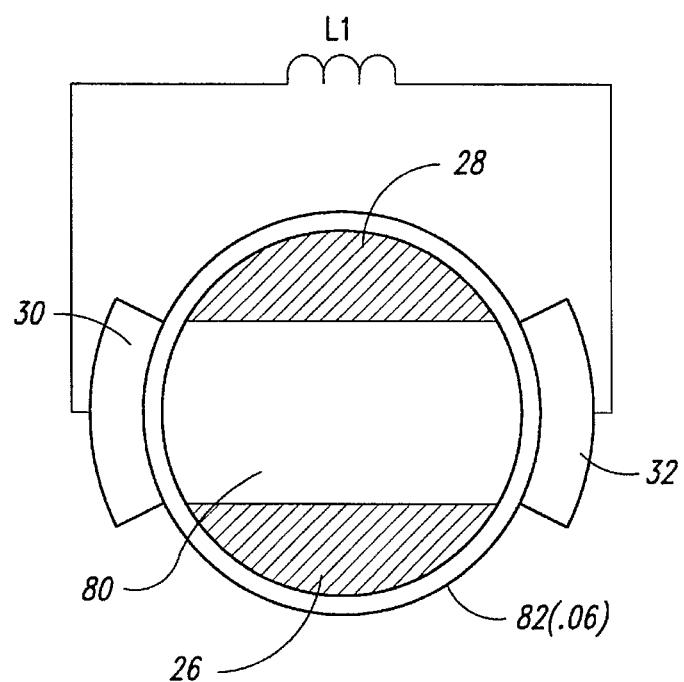
FIG. 7 is a cross-sectional view illustrating a second alternative embodiment of the construction of the discharge region of the present invention.

A first alternative embodiment is shown in FIG. 7. This second alternative embodiment includes a cylindrical discharge region 80 that is constructed from a hollow dielectric tube 82. The dielectric tube 82 is, for example, manufactured from a ceramic. The DC electrodes 26 and 28 are placed internal to the tube 82 and the RF electrodes 30 and 32 are placed external to the tube 82. This allows for simple construction of the dielectric chamber 80, and easy isolation of the DC electrodes from the RF electrodes.

Figure 6:
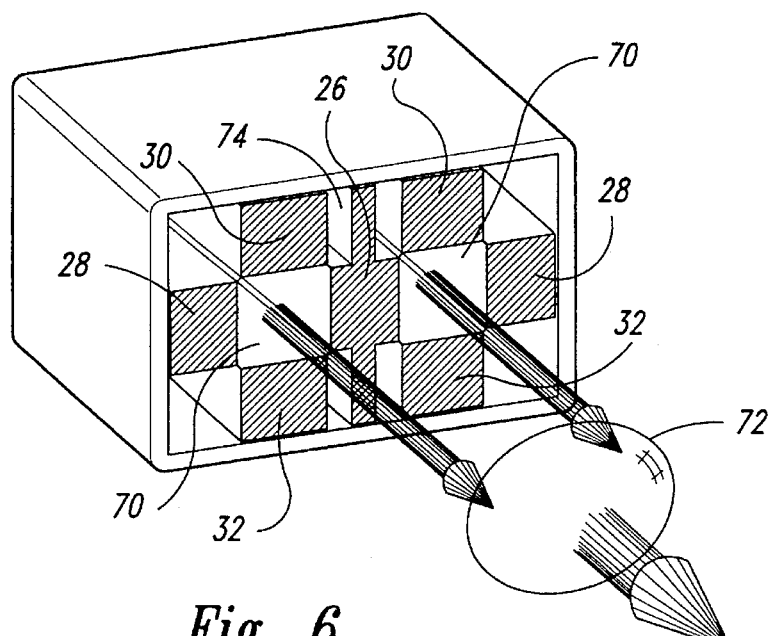
FIG. 6 is a perspective view illustrating a first alternative embodiment of the construction of the discharge region of the present invention.

A second alternative embodiment of the present invention is shown in FIG. 6. This first alternative embodiment includes multiple bores 70 and a plurality of DC and RF electrodes. Each bore 70 has its own discharge region and pairs of RF and DC electrodes where each bore emits a beam. The emitted beams are combined by a lens 72, or an equivalent optical device, to create a beam of even greater power but not requiring the length necessary of conventional laser discharge regions. Optional baffles 74 can be used to delineate different discharge sections.

In summary, by discharging RF energy with the RF electrodes 30 and 32 positioned orthogonal to the DC discharge electrodes 26 and 28, instead of using the same electrodes, a uniformly excited discharge region can be obtained. Further, the size and shape of the DC electrodes and the RF electrodes can be independently optimized to suit their respective RF and DC discharge requirements. Also, since the DC and RF signals are coupled to their respective electrodes by separate circuits, there is no need for filters to isolate the RF and DC components from one another. Finally, by using anodized dielectric coatings or monolithic ceramic homogeneous materials throughout the laser's structure, misalignments from thermal expansion during manufacture and operation are avoided.

Except as otherwise disclosed herein, the various components shown in outline or block form are individually well known and their internal construction and operation is not critical either to the making or the using of this invention or to a description of the best mode of the invention.

While the foregoing has been a discussion of specific embodiments of the present invention, those skilled in the art will appreciate that numerous modifications to the disclosed embodiments may be made without departing from the spirit and scope of the invention. Accordingly, the invention is limited only by the following claims.

What is claimed is:

1. A gas laser comprising:
    a housing including a discharge region fixat contains a lasing gas medium;
    a pair of DC electrodes having primary surfaces facing toward the discharge region, the primary surfaces being arranged in substantially parallel planes;
    a pair of RF electrodes having secondary surfaces facing toward the discharge region, the secondary surfaces being in substantially parallel planes with the secondary surfaces being arranged substantially orthogonal to the primary surfaces;
    an RF power source connected between said pair of RF electrodes and selectively generating an RF discharge in the discharge region; and
    a DC power source connected between said pair of DC electrodes and selectively generating a DC discharge in the discharge region, wherein at least one of the primary surfaces of the DC electrodes is shaped differently than the secondary surfaces of the RF electrodes to maximize the DC discharge without affecting the RF discharge.

2. The gas laser according to claim 1 wherein the different shaped primary surface of the DC electrodes has a Chang profile.

3. The gas laser according to claim 1 wherein at least one of the secondary surfaces comprises a substantially planar surface.

4. The gas laser according to claim 3 wherein edges around the secondary surfaces are rounded to reduce non-uniformities in the discharge distribution independent of the primary surfaces.

5. The gas laser according to claim 1 wherein the primary surfaces are separated by a distance of between 1 mm and 2 cm.

6. The gas laser according to claim 1 wherein the secondary surfaces are separated by a distance of between 1 mm to 7 mm.

7. The gas laser according to claim 1 wherein the primary surfaces are separated by a first distance that exceeds a second distance between the secondary Surfaces.

8. The gas laser according to claim 1 wherein said RF source provides an RF signal to the pair of RF electrodes sufficient to produce an RF discharge that ionizes the lasing gas medium in the discharge region.

9. The gas laser according to claim 1 wherein the housing comprises a stable resonator.

10. The gas laser according to claim 1, further comprising:
    a DC coupling circuit forming a connection between the DC power source and the pair of DC electrodes wherein the connection is controlled by a trigger pulse;

a pulse forming network emitting the trigger pulse; and an RF coupling circuit that connects the RF power source to the pair of RF electrodes wherein the DC coupling circuit and the RF coupling circuit are isolated from each other.

11. The gas laser according to claim 11 wherein the DC coupling circuit includes:

an SCR that connects the pair of DC electrodes to the DC power source via a low inductance parallel capacitor transmission line during the occurrence of the trigger pulse from the pulse forming network.

12. The gas laser according to claim 1 wherein the pair of DC electrodes are composed of a selected material and the pair of RF electrodes are composed of the selected material.

13. The gas laser according to claim 12 wherein the housing is composed of the selected material.

14. The gas laser according to claim 12 wherein the selected material is aluminum.

15. The gas laser according to claim 1, further comprising insulation positioned wherever one of the pair of DC electrodes adjoins one of the pair of RF electrodes, the insulation being positioned wherever the housing and at least a portion of one of the pair of DC electrodes and the pair of RF electrodes adjoin.

16. The gas laser according to claim 15 wherein the insulation comprises a layer of at least one of anodized aluminum and ceramic.

17. The gas laser according to claim 1 wherein the pair of DC and the pair of RF electrodes have a slab form geometry and define the discharge region therebetween.

18. The gas laser according to claim 1 wherein the housing comprises a cylindrical dielectric.

19. The gas laser according to claim 18 wherein the pair of RF electrodes are positioned external to the cylindrical dielectric and the pair of DC electrodes are positioned internal to the cylindrical dielectric.

20. A method for producing a beam of laser energy with a gas laser having a housing that contains a lasing gas medium, said method comprising the steps of:

providing a pair of substantially parallel RF electrodes connected to an RF power source, each of the RF electrodes having a first surface facing the lasing gas medium;

providing a pair of substantially parallel DC electrode connected to a DC power source, each of the DC electrodes being non-parallel DC electrodes connected to a DC electrodes and having a second surface facing the lasing gas medium; applying a high frequency signal from the RF power source to the pair of RF electrodes, producing an RF discharge in the lasing gas medium that is sufficient to ionize the lasing gas medium between the first surfaces of the pair of RF electrodes; and applying DC current from the DC power source to the pair of DC electrode simultaneously with the application of the high frequency signal from the RF power source to the pair of RF electrodes, thereby producing a DC discharge in the lasing gas medium simultaneously with the RF discharge.

21. The method of claim 20 wherein the step of providing DC current includes: applying a DC pulse from the DC power source to the pair of DC electrodes to produce the DC discharge after the lasing gas medium has been ionized by the RF discharge.

22. The method of claim 21 wherein the step of applying DC pulse further comprises the steps of:

transmitting a trigger pulse to a DC coupling circuit that couples the DC power source to the pair of DC electrodes; and electrically connecting the DC power source to the pair of DC electrodes via the DC coupling circuit in response to the trigger pulse.

23. The method of claim 21, timber comprising the step of: producing the DC discharge independently of the RF discharge.

24. The method of claim 21, further comprising the steps of: separating the pair of RF electrodes from each other by a second distance, and separating the pair of DC electrodes from each other by a second distance with the first distance being less than the second distance.

25. A gas laser comprising:

a housing including a first bore with a first discharge region that contains a lasing gas medium;

a first pair of DC electrode surfaces facing toward the first discharge region, the DC electrode surfaces being substantially parallel to each other;

a first pair of RF electrode surfaces facing toward the first discharge region and arranged substantially parallel to each other but not parallel to the first pair of DC electrode surfaces;

an RF power source physically connected by an RF coupling circuit to the first pair of RF electrode surfaces;

a DC power source physically connected by a DC coupling circuit to the pair of DC electrode surfaces, the DC power source and the DC coupling circuit being isolated from the RF power source and the RF coupling circuit; and a switching circuit in communication with at least the DC coupling circuit for switching between a continuous wave mode and a pulse mode by electrically connecting the DC power source to the first pair of DC electrode surfaces to provide the pulse mode and electrically disconnecting the DC power source from the first pair of DC electrode surfaces to provide the continuous wave mode.

26. The gas laser of claim 25, further including:

a second pair of DC electrode surfaces facing toward a second discharge region within the housing, the second pair of DC electrode surfaces being substantially parallel to each other;

a second pair of RF electrode surfaces facing toward the second discharge region and arranged substantially parallel to each other but not parallel to the second pair of DC electrode surfaces; wherein a first laser beam is formed in the first discharge region and a second laser beam is formed in the second discharge region; and an optical device that combines the first and second laser beams into a combined laser beam.

27. A gas laser according to claim 25 wherein one of the DC electrode surfaces of the first pair of DC electrode surfaces is shaped to provide a uniform discharge distribution.

28. A gas laser comprising:

a housing including a discharge region that contains a lasing gas medium;

a pair of DC electrodes having primary surfaces facing toward the discharge region, the primary surfaces being arranged in substantially parallel planes and being separated from each other by a first distance;

a pair of RF electrodes having secondary surfaces facing toward the discharge region, the secondary surfaces being in substantially parallel planes with the secondary surfaces being arranged substantially orthogonal to the primary surfaces and being separated from each other by a second distance that is less than the first distance;

an RF power source connected between said pair of RF electrodes and selectively generating an RF discharge in the discharge region; and a DC power source connected between said pair of DC electrodes and selectively generating a DC discharge in the discharge region.

* * * * *

UNITED STATES PATENT AND TRADEMARK OFFICE
CERTIFICATE OF CORRECTION

PATENT NO. : 5,596,593
DATED : January 21, 1997
INVENTOR(S) : Katherine D. Crothall et al.

It is certified that error appears in the above identified patent and that said Letters Patent is hereby corrected as shown below:

In column 10, claim 1, line 20, please delete "fixat" and insert therefor --that--.

In column 10, claim 7, line 57, please delete "Surfaces" and insert therefor --surfaces--.

In column 11, claim 20, line 45, please delete "electrode" and insert therefor --electrodes--.

In column 11, claim 20, lines 47-48, please delete "DC electrodes connected to a DC" and insert therefor --with respect to the pair of--.

In column 11, claim 20, line 51, following "electrodes," please insert --thereby--.

In column 11, claim 20, line 56, please delete "electrode" and insert therefor --electrodes--.

In column 11, claim 22, line 66, following "applying" please insert --the--.

In column 12, claim 23, line 7, please delete "timber" and insert therefor --further--.

In column 12, claim 24, line 12, please delete "second" and insert therefor --first--.

UNITED STATES PATENT AND TRADEMARK OFFICE
CERTIFICATE OF CORRECTION

PATENT NO. : 5,596,593
DATED : January 21, 1997
INVENTOR(S) : Katherine D. Crothall et al.

It is certified that error appears in the above-indentified patent and that said Letters Patent is hereby corrected as shown below:

In column 10, claim 1, line 20, please delete "fixat" and insert therefor --that--.

In column 10, claim 7, line 57, please delete "Surfaces" and insert therefor --surfaces--.

In column 11, claim 20, line 45, please delete "electrode" and insert therefor --electrodes--.

In column 11, claim 20, lines 47-48, please delete "DC electrodes connected to a DC" and insert therefor --with respect to the pair of--.

In column 11, claim 20, line 51, following "electrodes," please insert --thereby--.

In column 11, claim 20, line 56, please delete "electrode" and insert therefor --electrodes--.

In column 11, claim 22, line 66, following "applying" please insert --the--.

In column 12, claim 23, line 7, please delete "timber" and insert therefor --further--.

In column 12, claim 24, line 12, please delete "second" and insert therefor --first--.

UNITED STATES PATENT AND TRADEMARK OFFICE
CERTIFICATE OF CORRECTION

PATENT NO. : 5,596,593
DATED : January 21, 1997
INVENTOR(S) : Katherine D. Crothall et al.

It is certified that error appears in the above-indentified patent and that said Letters Patent is hereby corrected as shown below:

In column 12, claim 23, line 7, please delete "timber" and insert therefor --further--.

Signed and Sealed this

Twelfth Day of August, 1997

Attest:

BRUCE LEHMAN

Attesting Officer

Commissioner of Patents and Trademarks